United States Patent
Noerpel et al.

(10) Patent No.: US 9,642,037 B2
(45) Date of Patent: May 2, 2017

(54) SYSTEM AND METHOD FOR CONGESTION MANAGEMENT FOR DOWNLINK QUEUES OF DIGITAL PROCESSING SATELLITES FOR DIFFERENTIATED QUALITY-OF-SERVICE (QOS)

(71) Applicant: Hughes Network Systems, LLC, Germantown, MD (US)

(72) Inventors: Anthony Noerpel, Lovettsville, VA (US); Rajeev Gopal, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/674,055

(22) Filed: Mar. 31, 2015

(65) Prior Publication Data
US 2015/0282003 A1 Oct. 1, 2015

Related U.S. Application Data

(60) Provisional application No. 61/973,250, filed on Mar. 31, 2014.

(51) Int. Cl.
*H04W 28/12* (2009.01)
*H04W 28/02* (2009.01)
(Continued)

(52) U.S. Cl.
CPC .... *H04W 28/0289* (2013.01); *H04B 7/18584* (2013.01); *H04L 5/0092* (2013.01);
(Continued)

(58) Field of Classification Search
CPC ..... H04W 28/02; H04W 72/04; H04W 28/12; H04L 5/00
See application file for complete search history.

(56) References Cited

U.S. PATENT DOCUMENTS 6,377,561 B1 * 4/2002 Black ................. H04B 7/18584
 370/330
6,445,707 B1 * 9/2002 Iuoras ................. H04L 12/5602
 370/232
(Continued)

OTHER PUBLICATIONS

US Patent Office, "International Search Report & Written Opinion", PCT-US2015-023484, Dec. 8, 2015.

*Primary Examiner* — Lakeram Jangbahadur
(74) *Attorney, Agent, or Firm* — Potomac Technology Law, LLC

(57) ABSTRACT

Approaches are provided for a congestion detection algorithm for detection of congestion in outroute port queues (associated with respective satellite downlink beams), of a Layer 2 switch on-board a processing satellite, before the congestion reaches the point of dropping packets. Such approaches employ congestion notification protocols to inform all inroute sources of the congested ports. The on-board Layer 2 switch sends congestion notifications to the on-board system controller. The system controller broadcasts a notification reflecting the report of contested ports/beams to source terminals. The source terminals then segregate bandwidth requests regarding traffic destined for congested beams from traffic destined to all uncongested beams, and categorize such requests based on respective traffic priority levels. The system controller makes bandwidth grants according to congestion (for example allowing only higher priority traffic on congested beams) to alleviate the congestion conditions of the respective ports/beams.

18 Claims, 10 Drawing Sheets

(51) Int. Cl.
  *H04L 5/00*      (2006.01)
  *H04W 72/04*     (2009.01)
  *H04L 12/825*    (2013.01)
  *H04B 7/185*     (2006.01)

(52) U.S. Cl.
  CPC .......... *H04L 47/263* (2013.01); *H04W 28/12* (2013.01); *H04W 72/0486* (2013.01)

(56) References Cited

U.S. PATENT DOCUMENTS

| | | |
|---|---|---|
| 2002/0089956 A1 | 7/2002 | Haugli et al. |
| 2003/0169699 A1 | 9/2003 | Haardt |
| 2005/0144306 A1* | 6/2005 | Hart ........................ H04L 47/10 709/232 |

* cited by examiner

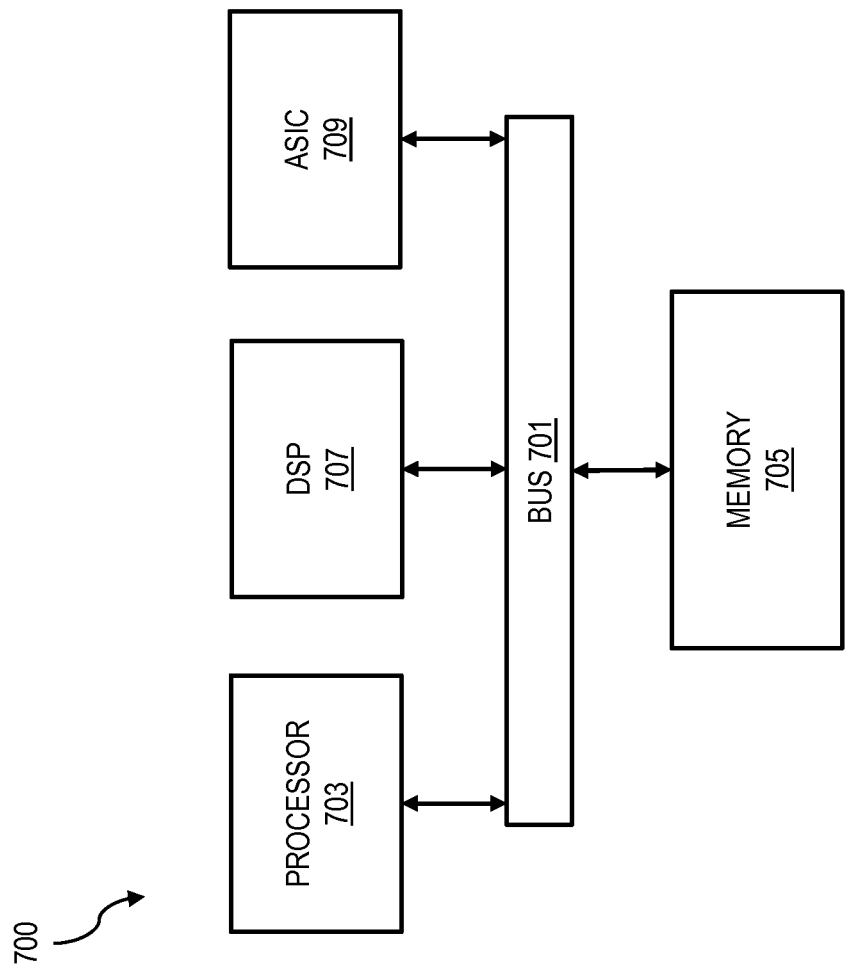

SYSTEM AND METHOD FOR CONGESTION MANAGEMENT FOR DOWNLINK QUEUES OF DIGITAL PROCESSING SATELLITES FOR DIFFERENTIATED QUALITY-OF-SERVICE (QOS)

RELATED APPLICATIONS

This application claims the benefit of the earlier filing date under 35 U.S.C. §119(e) of U.S. Provisional Application Ser. No. 61/973,250 (filed 2014 Mar. 31).

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems. For example, in a network with multiple remote nodes (e.g., remote terminals) using shared bandwidth to attempt to send data into the network, quality of service (QoS) is required on every link of the network in each direction. Further, an appropriate bandwidth allocation mechanism is required to achieve the QoS requirements for interactive traffic and to optimize channel utilization (e.g., to increase bandwidth availability, while decreasing bandwidth waste).

The IEEE standard 802.1Q-2011 describes a protocol/algorithm for congestion management, which provides for detection of congestion for a LAN port queue, before the congestion reaches a level where packet dropping becomes necessary. This IEEE standard uses a congestion notification protocol to inform all inroute sources (which themselves may be Layer 2 switches) of the congested port. The inroute switches then take autonomous action to independently throttle back their traffic intended for the congestion point. Since these Layer 2 switches only have limited queue depth themselves, and limited knowledge of the network layer information, their decisions with regard to which packets to drop may be sub optimal and can compromise quality or service (QoS). While such may be acceptable for best-efforts traffic, such an approach may compromise QoS for higher priority traffic (e.g., requiring assured QoS). For mitigation, these switches may have more granular information (such as traffic type) in a DiffServe Code Point (e.g., with 64 possible values) in the IP packet header, which would enable more intelligent dropping policy within the localized context of the switch. Such a mitigation approach, however, may or may not be as good as having complete network layer information (including network level routing and additional QoS policies), which a Layer 3 router typically may have knowledge of.

This approach, however, does not scale well for satellite networks which have a very large fan-in and fan-out connectivity per node (e.g., typically more than two to three orders of magnitude compared to their terrestrial counterparts). For example, a satellite system provides for potentially thousands of possible sources or terminals. In fact, all terminals in the system are potential sources for any or all of the satellite downlink ports. Terminals only request bandwidth and receive grants from a system controller for their uplinks, and then (under the 802.1Q approach) thousands of terminals potentially would have to independently decide how much to throttle back their traffic intended for the congested ports, which can result in incoherent, sub-optimal decisions at the system level and significantly inefficient bandwidth usage. Further, the added delay of satellite round-trips (especially for GEO satellites) further reduces performance of such distributed and difficult to coordinate decision making.

Further, existing ETSI/TIA RSM-A based satellite communications systems exhibit further limitations in congestion management. In the RSM-A system, the satellites have an on-board Layer 2 switch and an on-board bandwidth on demand resource allocation processor, which does not employ the congestion management approach of the IEEE 802.1Q standard. The on board Layer 2 switch of this ETSI/TIA RSM-A based satellite communications system marks congested downlinks with a bit in each transmitted packet, and receiving terminals are to notify source terminals of the congestion. Transmitting terminals then are required to independently throttle back traffic flow to the congested downlinks. Receiving terminals whose packets got dropped by the Layer 2 switch on board the satellite do not receive the bit. Problems include too much additional delay, an additional round trip delay in order to inform the source terminals of the congestion.

What is needed, therefore, is an approach for efficient management of congestion with respect to the downlink queues of packet switches in digital processing satellites and high altitude platforms, to assure differentiated Quality of Service (QoS) and efficient use of bandwidth in wireless microwave communications systems.

Some Example Embodiments

The present invention advantageously addresses the foregoing requirements and needs, as well as others, by providing approaches for efficiently managing congestion with respect to the downlink queues of packet switches in digital processing satellites and high altitude platforms to assure differentiated Quality of Service (QoS) and efficient use of bandwidth in wireless microwave communications systems.

Embodiments of the present invention provide new approaches for managing congestion on the downlink queues of digital processing satellites and high altitude platforms to assure differentiated Quality of Service (QoS) and efficient use of system bandwidth. Such approaches, for example, may be applied to Geostationary Earth Orbit (GEO) satellites, Low Earth Orbit (LEO) satellites, Mid Earth Orbit (MEO) satellites or High Altitude Platforms (HAP). By way of example, such approaches may be applied where multiple uplink and downlink beams are implemented in a mesh connected network enabled by a processing payload. By way of further example, in such systems, some beams may be used to support inter-satellite links (ISL), which also may benefit from congestion management.

In accordance with such example embodiments, approaches are provided for a congestion detection algorithm for detection of congestion in outroute port queues (associated with respective satellite downlink beams), of a Layer 2 switch on-board a processing satellite, before the congestion reaches the point of dropping packets. Such approaches employ congestion notification protocols to inform all inroute sources of the congested ports. The on-board Layer 2 switch sends congestion notifications to the on-board system controller. The system controller broadcasts a notification reflecting the report of contested ports/beams to source terminals. The source terminals then segregate bandwidth requests regarding traffic destined for congested beams from traffic destined to all uncongested beams, and categorize such requests based on respective traffic priority levels. The system controller makes bandwidth grants according to congestion (for example allowing only higher priority traffic on congested beams) to alleviate the congestion conditions of the respective ports/beams.

According to example embodiments, in a Layer 2 processing satellite system, the satellite may have an on-demand uplink and/or downlink resource manager, implemented within or configured to operate in conjunction with a system controller, on-board the satellite to which terminals send requests for uplink bandwidth. This system controller (SC) function may also be located on the ground in a hub or gateway station. Such an implementation allows the use of a compartmentalized architecture where onboard nodes provide Layer 2 data forwarding, while the control plane decision making is implemented in a separate and centralized node. The SC, under such software defined satellite networks, grants up link resources to the requesting terminals based on demand as well as traffic and terminal priority while leveraging additional system-wide information and historical network state and performance data. Example embodiments utilize this SC (and its system-wide knowledge), including the case of a constellation of satellites equipped with ISLs, in a new improved congestion mitigation protocol.

According to one example embodiment, the on-board Layer 2 switch of each satellite sends a congestion notification to the system controller. By way of example, this congestion notification contains the raw queue status for all the downlink queues. The system controller uses an algorithm to process all raw queue status and generate a system-wide list of congested downlinks for each traffic type which is broadcast to all of the sourcing terminals. Sourcing terminals segregate the traffic demand per traffic type for the congested links from all other traffic demand in their resource request messages. The system controller can thus allocate sufficient uplink resources to source terminals intended for uncongested downlinks but only allocate a portion of the requested bandwidth, to address higher priority traffic demand, for congested links. In this way the system controller can keep the downlink queues in the congested beams full without overflowing so that the satellite Layer 2 switch does not have to indiscriminately drop packets and at the same time ensuring a high quality of service for priority traffic classes. According to an alternate example embodiment, the on-board switch may broadcast the congestion notification simultaneously to the system controller and all the source terminals. This works well if the system controller is located on the ground rather than the satellite, and thus can further optimize decision making because of increased amount of system-wide information (both current and historical) and more software and hardware resources for rapid and more comprehensive decision making.

According to further embodiments, certain aspects of the present invention (e.g., the system controller based broadcast of congestion information), can also be applied to a network with Layer 3 processing to reduce the software and hardware implementation complexity of Layer 3 switches and routers on satellites and HAPs.

Such example embodiments provide various advantages, including mitigation of downlink congestion and ensuring differentiated QoS on a processing satellite or high altitude platform with multiple downlink beams and or inter-satellite links. The satellites can be in geostationary orbit or in a low earth or mid earth orbit, and the system may be a single platform system or a constellation.

According to an example embodiment, a method is provided for congestion management in a satellite communications system comprising a processing satellite, wherein the processing satellite comprises an on-board traffic switch. A utilized capacity level with respect to at least one outroute port of the traffic switch is determined. A capacity report is provided to a system controller, wherein the capacity report indicates the determined utilized capacity level for each port. It is then determined that one or more of the utilized capacity level(s) indicates a congestion condition of the respective port. A congestion notification is provided to one or more source satellite terminals (STs) that have data packets destined for at least one of the port(s) with respect to which the utilized capacity level indicates the congestion condition. A feedback report is received from each of the source STs to which the congestion notification report was provided, wherein each feedback report indicates a quantity of the data packets destined for each port exhibiting the congestion condition and a breakdown of each quantity of data packets by priority level. An uplink allocation is determined for each of the source STs that has data packets destined for port(s) exhibiting the congestion condition, wherein each uplink allocation is based on the feedback report received from the respective ST, and wherein the uplink allocation to all of the source STs is configured to alleviate the congestion condition of each port that exhibits the condition. The respective uplink allocation is sent to each of the source STs that has data packets destined for port(s) exhibiting the congestion condition.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 illustrates a chip set upon which example embodiments of the present invention may be implemented.

DETAILED DESCRIPTION

Figure 1:
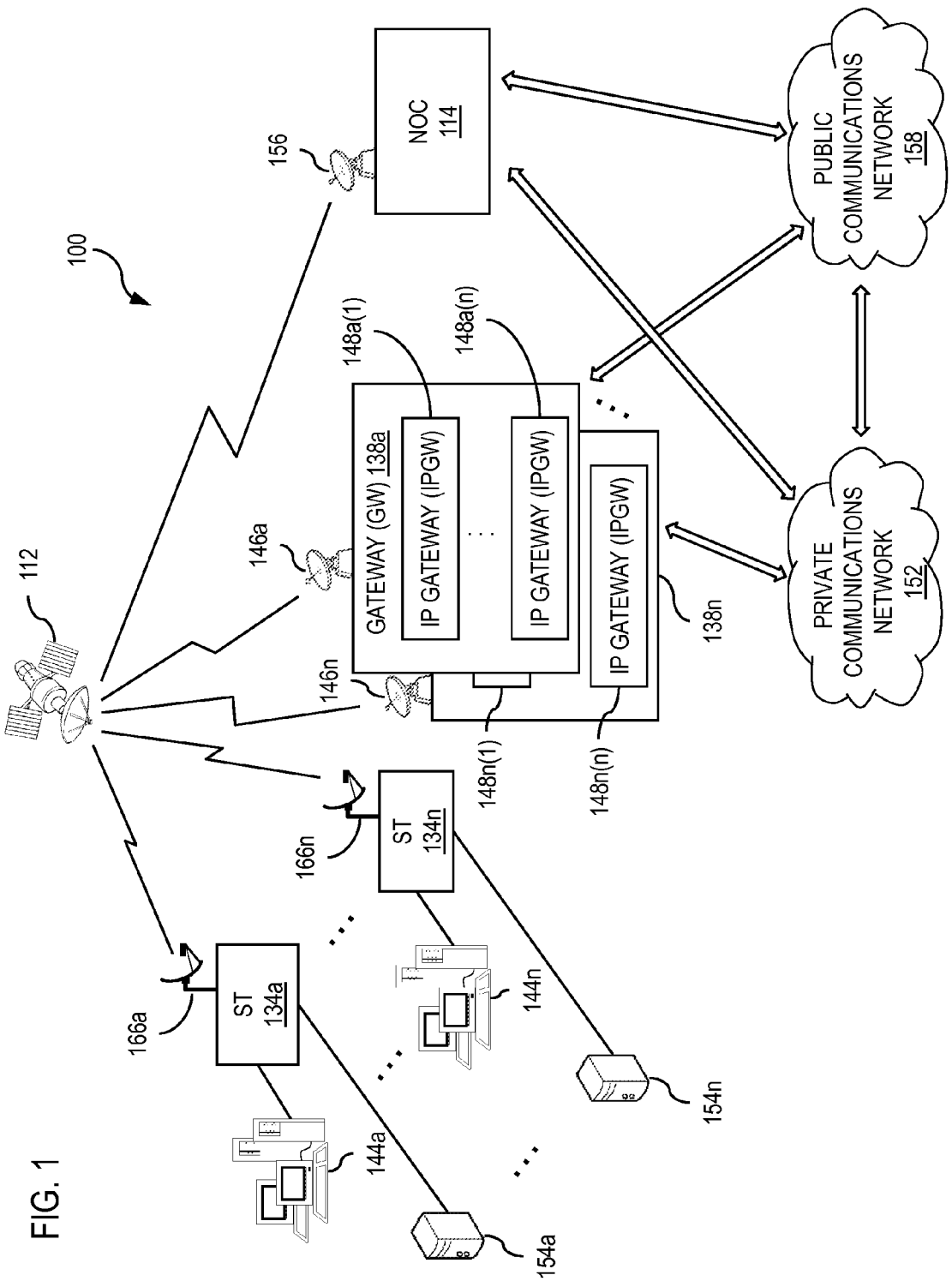
FIG. 1 illustrates a satellite communications system, employing a distributed gateway architecture, capable of employing approaches for efficient management of congestion for the downlink queues of a packet switch on-board a processing satellite, in accordance with example embodiments of the present invention.

Approaches for efficiently managing congestion with respect to the downlink queues of packet switches, in digital processing satellites and high altitude platforms, to assure differentiated Quality of Service (QoS) and efficient use of bandwidth in wireless microwave communications systems, is described. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

FIG. 1 illustrates a satellite communications system 100, employing a distributed gateway architecture, capable of employing approaches for efficient management of congestion for the downlink queues of a packet switch on-board a processing satellite, in accordance with example embodiments of the present invention. Satellite communications system 130 includes a satellite 112 that supports communications among multiple satellite terminals (STs) 134a-134n, a number of gateways (GWs) 138a-138n, and a network operations center (NOC) 114. The STs, GWs and NOC transmit and receive signals via the antennas 166a-166n, 146a-146n, and 156, respectively. According to different embodiments, the NOC 114 may reside at a separate site reachable via a separate satellite channel or may reside within a GW site. The NOC performs the management plane functions of the system 130, while the GWs 138a-138n perform the data plane functions of the system 130. For example, the NOC performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC communicates with each GW via the satellite 112, or via a secure private communications network 152 (e.g., an IPsec tunnel over a dedicated link or a virtual private network (VPN) or IPsec tunnel through a public network, such as the Internet). It should be noted that, according to one exemplary embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further exemplary embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 114. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n). Further as would be apparent to one of skill in the art, such a distributed system 100 may employ multiple satellites (e.g., LEOs, MEOs or GEOs) or multiple high altitude platforms (HAPS).

Figure 2:
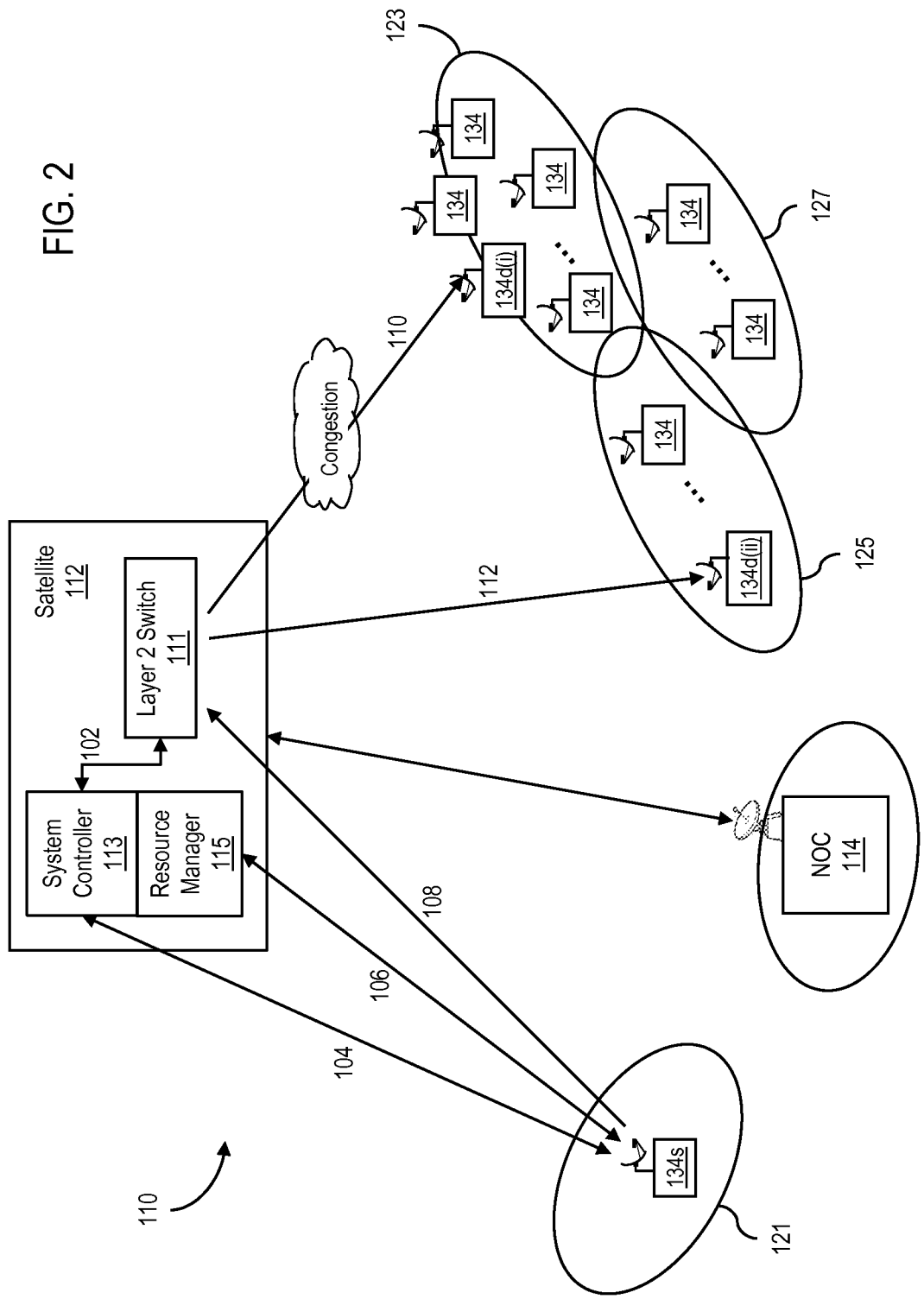
FIG. 2 illustrates a data communications system that employs efficient management of congestion for the downlink queues of a packet switch on-board a single processing satellite, where the congestion management is implemented via a controller on-board the satellite, in accordance with example embodiments of the present invention.
Figure 4:
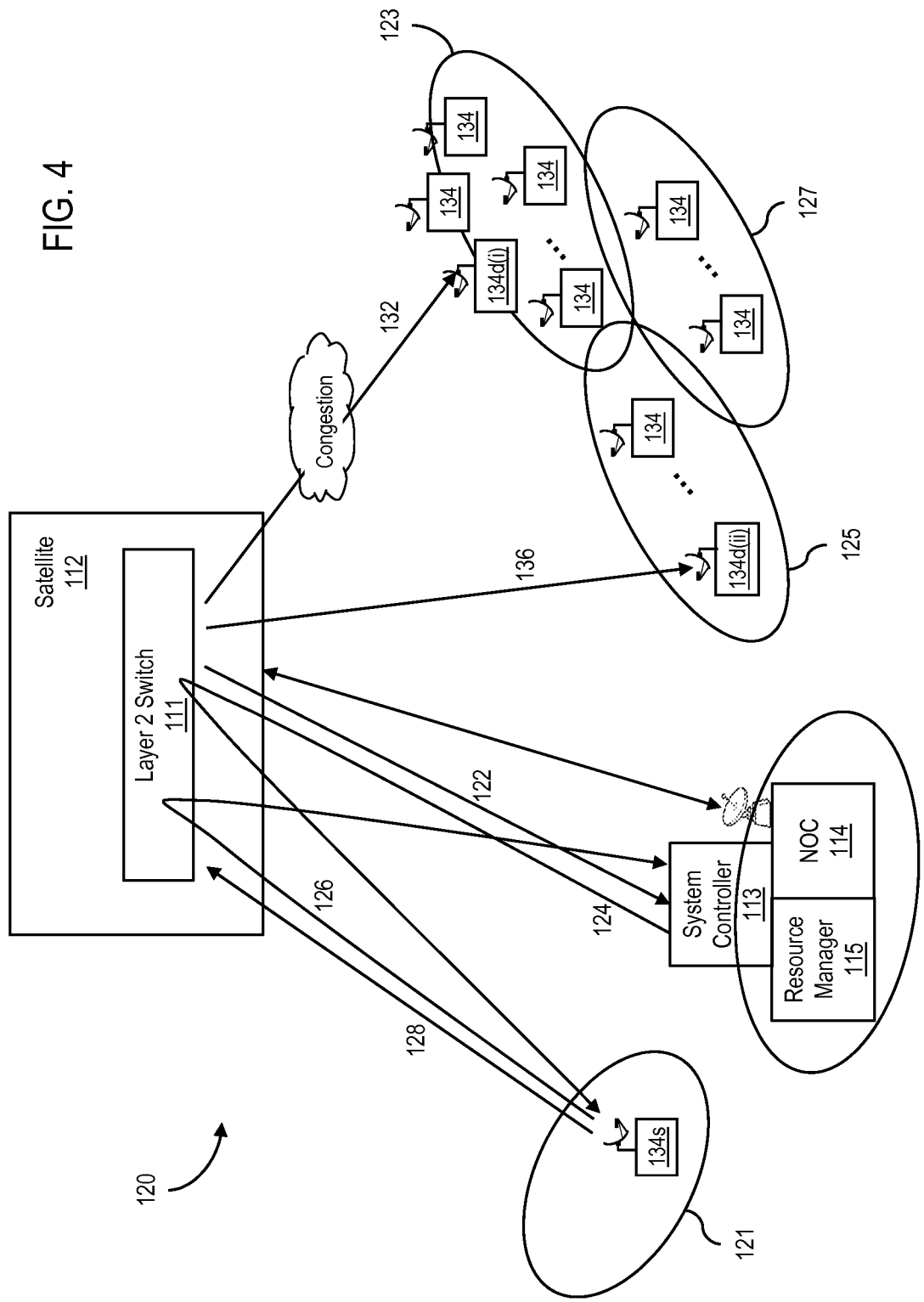
FIG. 4 illustrates a data communications system that employs efficient management of congestion for the downlink queues of a packet switch on-board a single processing satellite, where the congestion management is implemented via a controller at a hub gateway site of the ground system, in accordance with example embodiments of the present invention.
Figure 5:
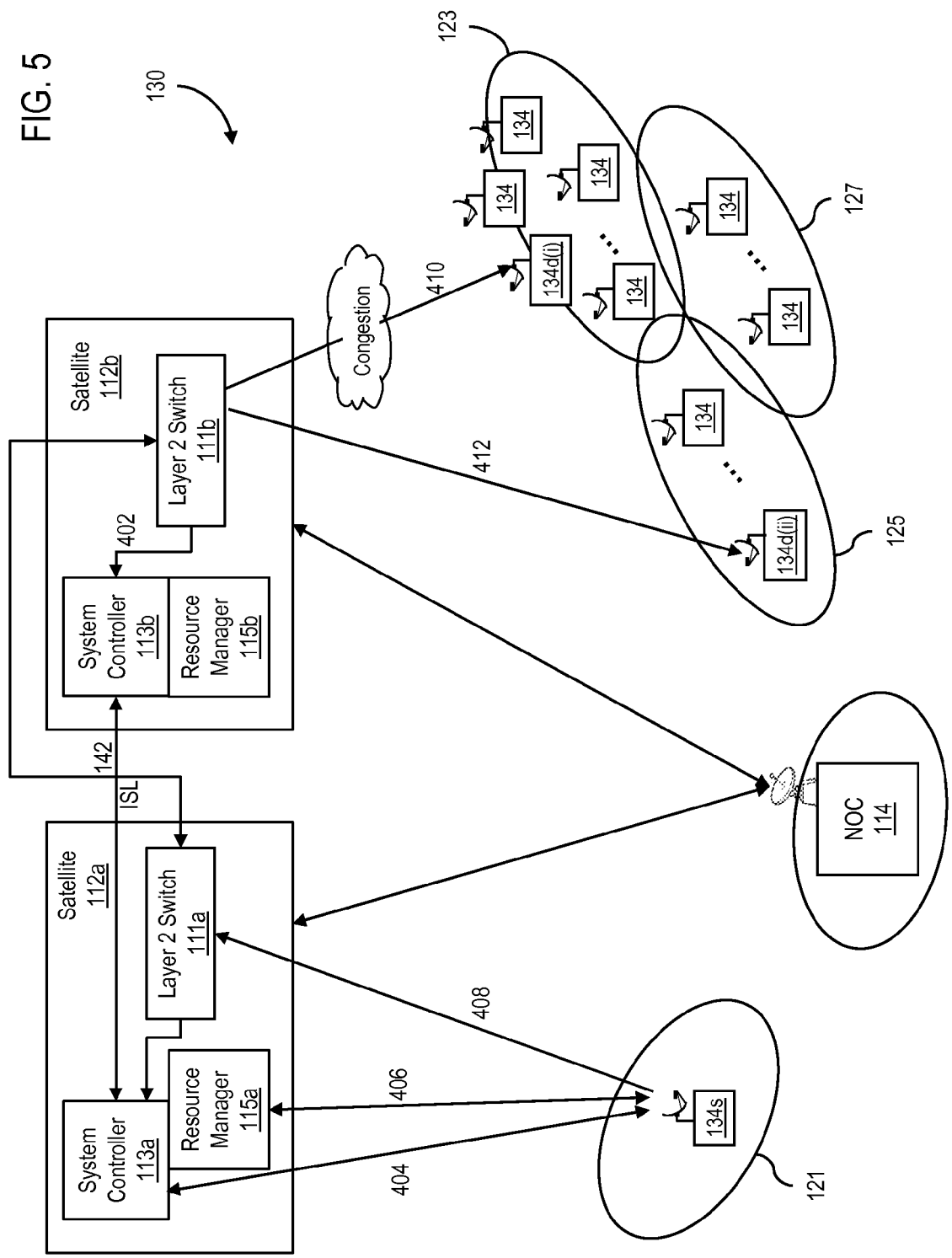
FIG. 5 illustrates a data communications system that employs efficient management of congestion for the downlink queues of packet switches on-board multiple processing satellites with inter-satellite links, where the congestion management is implemented controllers on-board the satellites, in accordance with example embodiments of the present invention.

FIG. 2 illustrates a data communications system that employs efficient management of congestion for the downlink queues of a packet switch on-board a single processing satellite, where the congestion management is implemented via a controller on-board the satellite, in accordance with example embodiments of the present invention. FIG. 4 illustrates a data communications system that employs efficient management of congestion for the downlink queues of a packet switch on-board a single processing satellite, where the congestion management is implemented via a controller at a hub gateway site of the ground system, in accordance with example embodiments of the present invention. FIG. 5 illustrates a data communications system that employs efficient management of congestion for the downlink queues of packet switches on-board multiple processing satellites with inter-satellite links, where the congestion management is implemented controllers on-board the satellites, in accordance with example embodiments of the present invention. With reference to FIG. 2, FIG. 4 and FIG. 5, satellite communications system 110/120 includes a satellite 112 that supports communications among multiple satellite terminals (STs) 134, and satellite communications system 130 includes multiple satellites (two in this example, 112a and 112b) that also supports communications among the multiple satellite terminals (STs) 134 (however, the system 130 also supports such communications via over the air inter-satellite links (ISL)—such as link 142 between the two satellites 112a and 112b). The network operations center (NOC) 114 performs the management plane functions of the system 110/120/130, for example, such functions as network management and configuration, software downloads (e.g., to the STs 134), status monitoring, statistics functions (e.g., collection, aggregation and reporting), security functions (e.g., key generation, management and distribution), and ST registration and authentication.

In a bent-pipe system, the satellite 112 operates as a repeater or bent pipe, whereby communications to and from the STs 134 are transmitted over the satellite 112 to and from respective IP gateways (IPGWs) 148 or gateways (GWs) 138 associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST.

Alternatively, in a communications system 110 that employs a processing satellite (e.g., including a packet switch operating, for example, at a data link layer), the system may support direct unicast (point-to-point) communications and multicast communications among the STs 134. With reference to FIG. 2, the satellite 112 includes a layer 2 switch 111. In the case of a processing satellite, the satellite 112 decodes the received signal and determines the destination ST or STs. The satellite then addresses the data accordingly, encodes and modulates it, and transmits the modulated signal to the beam within which the destination ST or STs is/are located. In other words, the switch 111 is capable of switching layer 2 packets from multiple inputs to multiple outputs, and can thereby combine source packets from multiple sources that are destined for one or more STs located within a single destination beam. According to example embodiments, the system 110 thereby provides a fully meshed architecture, whereby the STs 134 directly communicate, via a single hop, over the satellite 112. By way of example, a processing satellite with a Layer 2 switch can switch Layer 2 packets from multiple inputs to multiple outputs. In the systems we are discussing these include uplink and downlink spot beams and inter satellite links. Since space qualified memory is expensive the downlink queues may not be very deep. If they become full Layer 2 packets must be indiscriminately dropped which can result in reduced throughput and QoS. A Layer 2 satellite is desirable because of satellite size, weight and power (SWaP) constraints and with a significantly reduced need to provide hardware and software resources for layer 3 functions. Furthermore, an on-board Layer 2 switch can enable software defined satellite networks. The data plane in such a network is implemented in the satellite Layer 2 switches. These switches are controlled by a ground-based controller which has system-wide knowledge of network state, traffic requirements, and operational constraints to enable optimal decision making.

In the single satellite example of FIG. 2, the satellite 112 includes the Layer 2 switch (L2S) 111, the system controller (SC) 113 and the resource manager 115. A source ST 134s is located within the uplink beam 121, and several STs are located within the downlink beams 123, 125, 127. Further, a first destination ST 134(d)(ii) is located within the downlink beam 125, and a second destination ST 134(d)(i) is within the downlink beam 123. As further depicted, the downlink beam 123 is suffering from congestion. Such congestion may be attributable to various causes. For example, in satellite systems and HAP systems with spot beams, traffic to a downlink beam may vary as mobile terminals move in and out of a particular beam. In that context, and unanticipated influx of mobile terminals into a particular beam may cause congestion within that beam. As another example, weather situations may cause the system to utilize more bandwidth within a beam to support additional and more robust error coding to overcome weather related fades. As a further example, some systems may experience accidental or purposeful jamming or interference reducing the downlink throughput in the beam. Power constraints on a satellite may impact the downlink resources available within a beam as well. Further, for low Earth and mid Earth orbiting satellites, the beams sweep over the ground and can pass from low traffic density areas to high traffic density areas where congestion may occur.

In the system 110, the source ST 134s may be transmitting data packet streams to the two destination STs 134d(i) and 134d(ii) within the downlink beams 123 and 125, respectively. Without the implementation of any congestion mitigation approaches, the ST 134s would blindly continue the transmission to both destination STs 134d(i) and 134d(ii). The packet stream destined for the ST 134d(ii) (within the downlink beam 125 that is not experiencing congestion) would arrive safely and intact, whereas the packet stream destined for the ST 134d(i) (within the downlink beam 123 that is experiencing congestion) may be impacted in that, once the downlink queue of the switch 111 for the downlink beam 123 fills up, packets would begin being dropped and not reach the respective target STs. In accordance with the approaches of example embodiments of the present invention, however, the Layer 2 switch 111 would detect the congestion in the downlink beam 123, and would accordingly send a congestion report to the SC 113 (e.g., via the signal line or connection 102)(S501, FIG. 6A). Upon receipt of the congestion report, the SC would send a congestion notification message or report to all potential source STs (including the source ST 134s) (S503, FIG. 6A). By way of example, the SC would broadcast such a congestion notification to all beams within which STs potentially transmitting to the congested beam 123 may be located.

Upon receipt of the congestion notification, the ST 134s would first segregate its uplink data traffic by destination beam and by priority (e.g., based on quality of service requirements for the respective traffic types, such as real-time voice over IP traffic, streaming media traffic, web browsing traffic, etc.). The ST 134s would then report back to the SC 113 as to the specific resource allocations required for each of the different traffic types the ST is attempting to transmit (S505, FIG. 6A). The congestion notification and the feedback report messaging are communicated via over the air transmission signals indicated by the communication line 104 between the ST 134s and the SC 113. Based on this report and associated uplink bandwidth request from the ST, the SC 113 in conjunction with the resource manager (RM) 115 allocates uplink bandwidth to the ST in order of priority (rationing the bandwidth allocations to meet the requirements of the ST while maintaining a traffic flow to not overload the downlink queue and alleviate the congestion of the respective beam), and sends the bandwidth allocations to the ST (S507, FIG. 6A). The bandwidth allocation would be configured so as to only allocate so much uplink bandwidth at a time so in order to alleviate the congestion within the downlink beam 123. The bandwidth request and bandwidth allocation messaging are communicated via over the air transmission signals indicated by the communication line 106 between the ST 134s and the RM 115. In other words, STs segregate any traffic requests for congested downlinks from the aggregate traffic request for all the other downlinks which are not experiencing congestion, and may further segregate such traffic on a priority basis. The system controller can then grant increased or decreased resources based on downlink congestion and based on the requirements of the ST (on a priority basis). The resulting data transmissions by the ST 134s are communicated via over the air uplink transmissions 108 (S509, FIG. 6A), and corresponding downlink transmissions 110 and 112. With respect to the data transmissions to the destination ST 134d(ii), because this ST is within the downlink beam 125 (which is not experiencing congestion), such transmissions occur based on a normal bandwidth request an allocation protocol.

With further regard to the allocation of bandwidth based on the congestion report, the ST feedback and associated uplink bandwidth request, the allocation can take into account overall system demand for traffic destined to the congested port/beam. In this regard, the system controller can determine uplink bandwidth allocations for each source ST based on the system controller's system-wide knowledge of traffic demands for the congested beam. In other words, the system controller can determine uplink bandwidth allocations for each source ST, taking into account, on a priority basis, the particular requirements of each ST and allocate bandwidth amongst the source STs to address priority requirements and to manage overall traffic/congestion with respect to the congested beam.

According to one example embodiment, the process of providing congestion notification and receiving feedback regarding uplink requirements on a priority basis would be performed on the basis of bandwidth request/allocation epochs. By way of example, a source terminal would report traffic demand every superframe or allocation epoch. The allocation epoch duration is largely influenced by the round trip delay between the system controller and the user terminals plus some queuing delay and processing time. Depending on the system this can vary from a few milliseconds to hundreds of milliseconds. The SC in turn grants uplink resources based on availability and priority for subsequent epochs, and the ST continues to make new requests every superframe or epoch. Meanwhile the Layer 2 switch reports the status of its queues to the system controller every epoch.

Further, in accordance with example embodiments, an approach for detection of congestion on one or more system links may be implemented as any one of many congestion detection algorithms without departing from the general scope of the subject matter regarded and/or claimed as embodiments of the invention. For example, the IEEE 802.1 standard describes a congestion detection approach/algorithm for determining when the congestion level regarding a Level 2 switch port (for a particular communications link) reaches a threshold level (e.g., a particular percentage indicating how full the queue currently is), prior to the point where the congestion reaches the level of dropping packets. The threshold level, for example, may take into account system characteristics (e.g., based on architecture, protocols, learning from past operation, etc.) and be set at a level that allows for sufficient time for the notification and throttling process managed by the system controller to kick in and begin alleviating the congestion before the level of dropping packets is reached. In accordance with such an algorithm, the point for the Level 2 switch generate a congestion indication or notification regarding any particular point may be programmed to be triggered when the congestion reaches the threshold level. According to a further embodiment, the Layer 2 switch may monitor its outroute queues based on a plurality of thresholds (e.g., 50%, 60%, 70%, etc.). In such a case, in the congestion report to the system controller, the switch may include each queue that is at a one of these thresholds, whereby the system controller would decide to engage the congestion management process with respect to one or more of such queues. Alternatively, the congestion report generated by a switch may include a complete report regarding all outroute ports/queues of that switch. The SC would then parse the report to determine which ports/queues were at the threshold congestion level, and provide the appropriate congestion notification to all STs that represent potential sources for uplink data destined for the particular ports/queues at the congestion threshold. Implementations where the system controller determines the trigger point for engaging the congestion management process provide for a central point of control for determining congestion thresholds and engagement of the congestion management process, and a central point for configuring or reconfiguring such thresholds and other aspects of the process to adjust for changing system conditions (e.g., system loading, deployment of additional gateways, etc.). Accordingly, approaches pursuant to embodiments of the present invention, provide for a flexible, highly scalable, and centrally configurable process for efficient congestion management and bandwidth usage in such a processing satellite or HAP systems.

Figure 3:
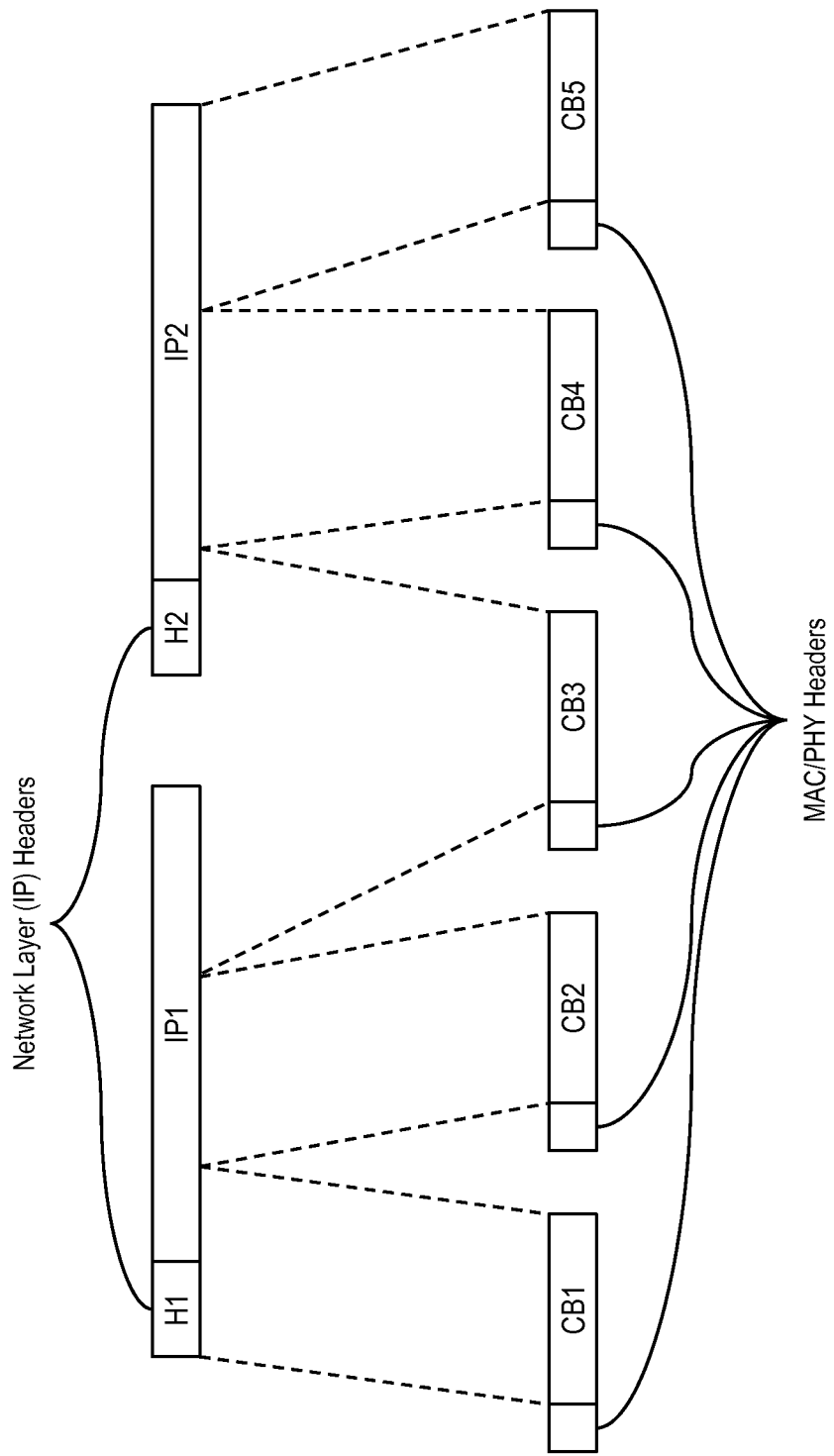
FIG. 3 illustrates an example of two network layer packets (e.g., IP packets) segmented and mapped to five different physical layer code block packets for transmission over the satellite channel or link of a communications system, in accordance with example embodiments of the present invention.

FIG. 3 illustrates an example of two network layer packets (e.g., IP packets) segmented and mapped to five different physical layer code block packets for transmission over the satellite channel or link of a communications system, in accordance with example embodiments of the present invention. The header H1 of the network layer packet IP1 and a portion of the payload are allocated to the payload of the code block packet CB1. A next portion of the network layer packet IP1 is allocated to the payload of the code block packet CB2. The last portion of the network layer packet IP1, along with the header H2 of the network layer packet IP2 and a small portion of the payload of that packet, are all allocated to the payload of the code block packet CB3. The next portion of the network layer packet IP2 is allocated to the payload of the code block packet CB4. The last portion of the network layer packet IP2 is allocated to the payload of the code block packet CB5. Note that code block packet CB3 contains segments from both network layer packets IP1 and IP2.

In such an example, without a congestion mitigation approach as provided by embodiments of the present invention, if the satellite Layer 2 switch is congested on the associated downlink port it may be forced to drop one or more of the code block packets (e.g., the code block packet CB3 may be dropped, while the other four code block packets CB1, CB2, CB4, CB5 may be transmitted unhindered). The receiving ST, therefore, would lose both network layer packets IP1 and IP2, even though most of the physical layer data was successfully received. Although, the higher layer protocols would most likely detect the lost packets and request retransmission, which may be received correctly, such would introduce unnecessary delay in view of the required retransmission, and the congested downlink will have been ineffectively utilized or wasted via the transmission of the incomplete network layer packets (which may be referred to as "bad-put"). With the approach is provided by example embodiments, however, based on the congestion report from the switch and the feedback from the ST, the system controller would be able to effectively allocate the bandwidth to the ST to avoid the loss and nuns unnecessary retransmission of these packets. Further, based on the congestion notification to the ST and the ST segregation of its uplink packets, the ST would be able to transmit the code block packets CB1-CB5 via multiple allocation epochs and thereby successfully transmit all of the code block packets. In other words, where the source terminal is notified of the congestion and only receives adequate uplink bandwidth for say three code blocks in one allocation epoch, downlink congestion would have been avoided (the switch would not have dropped any packets and the bad-put would thus have been avoided).

With reference to FIG. 4, in this embodiment, the system controller 113 and the resource manager 115 a located at the hub or network operations center (NOC) site 114 of the system 120. This architecture may be employed to minimize the software/hardware complexity impacts on the satellite. In the system 120, again the source ST 134s may transmit data packet streams to the two destination STs 134d(i) and 134d(ii) within the downlink beams 123 and 125, respectively. Here also, as with the system of FIG. 2, the Layer 2 switch 111 detects the congestion in the downlink beam 123. In this instance, in accordance with one embodiment, because the SC is located within the ground infrastructure at the NOC 114, the Layer 2 switch will transmit the congestion report (S501, FIG. 6A) over the air to the SC (as indicated by the transmission line 122). Upon receipt of the congestion report, the SC will transmit a congestion notification message or report (via the satellite) to all potential source STs (including the source ST 134s) (S503, FIG. 6A)—as indicated by the over the air transmission line 124. By way of example, the SC would transmit over the air to the satellite for broadcast transmission down to all beams within which STs potentially transmitting to the congested beam 123 may be located.

Figure 6A:
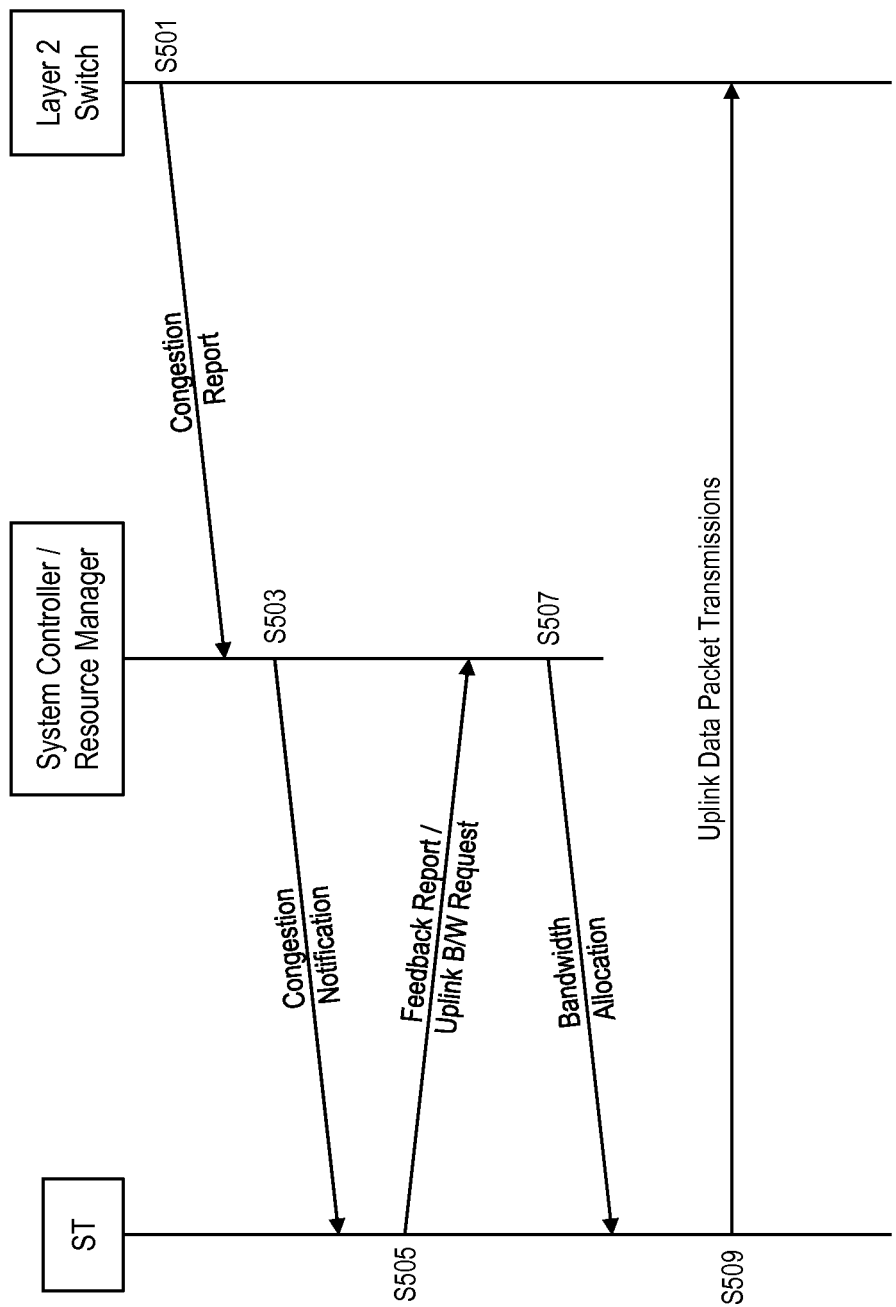
FIG. 6A illustrates a signal flow diagram depicting a process for efficient management of congestion for the downlink queues, where the congestion report is transmitted to the System Controller, in accordance with example embodiments of the present invention.

As with the approach of FIG. 2, based on the congestion notification, the ST 134s segregates its uplink data traffic by destination beam and by priority, and reports back to the SC 113 as to the specific resource allocations required for each of the different traffic types the ST is attempting to transmit (S505, FIG. 6A). Then, based on the report and associated uplink bandwidth request from the ST, the SC 113 in conjunction with the resource manager (RM) 115 allocates uplink bandwidth in consideration of the requirements of the ST and the need to alleviate the congestion within the downlink beam 123 (S507, FIG. 6A). The bandwidth request and bandwidth allocation messaging are communicated via over the air transmission signals indicated by the communication line 126. The system controller again grants increased or decreased resources based on downlink congestion and based on the requirements of the ST (on a priority basis). The resulting data transmissions by the ST 134s are communicated via over the air uplink transmissions 128 (S509, FIG. 6A), and corresponding downlink transmissions 132 and 136, where the data transmissions to the non-congested destination ST 134d(ii) occur based on a normal bandwidth request an allocation protocol.

In accordance with further embodiments, the system controller and the resource manager need not be co-located at a single gateway, but rather may be distributed amongst multiple gateways in a distributed architecture system, space such as the system 100 of FIG. 1. For example, in a distributed GEO system, a system controller and resource manager pair may be located at each of a number of gateways to manage the congestion control process of different regions of the cover geographical area. In such cases, the Layer 2 switch of each satellite would provide congestion reports or queue status reports to each system controller, and in turn each system controller would control the congestion management process for the STs serviced by the respective Gateway. In this context, the terminology system controller and resource manager pair is used to indicate that for overall or regional congestion management a system controller should have a reliable and robust means for communicating with the respective resource manager (e.g., the implementation of a system controller and resource manager for a particular region or for the whole system would be easier if the two were co-located).

Further, as with the approaches described above with respect to FIG. 2, the approaches described with respect to FIG. 4 may also be performed on the basis of bandwidth request/allocation epochs. By way of example, a source terminal would report traffic demand every superframe or allocation epoch. The SC in turn grants uplink resources based on availability and priority for subsequent epochs, and the ST continues to make new requests every superframe or epoch. Meanwhile the Layer 2 switch reports the status of its queues to the system controller every epoch.

Figure 6B:
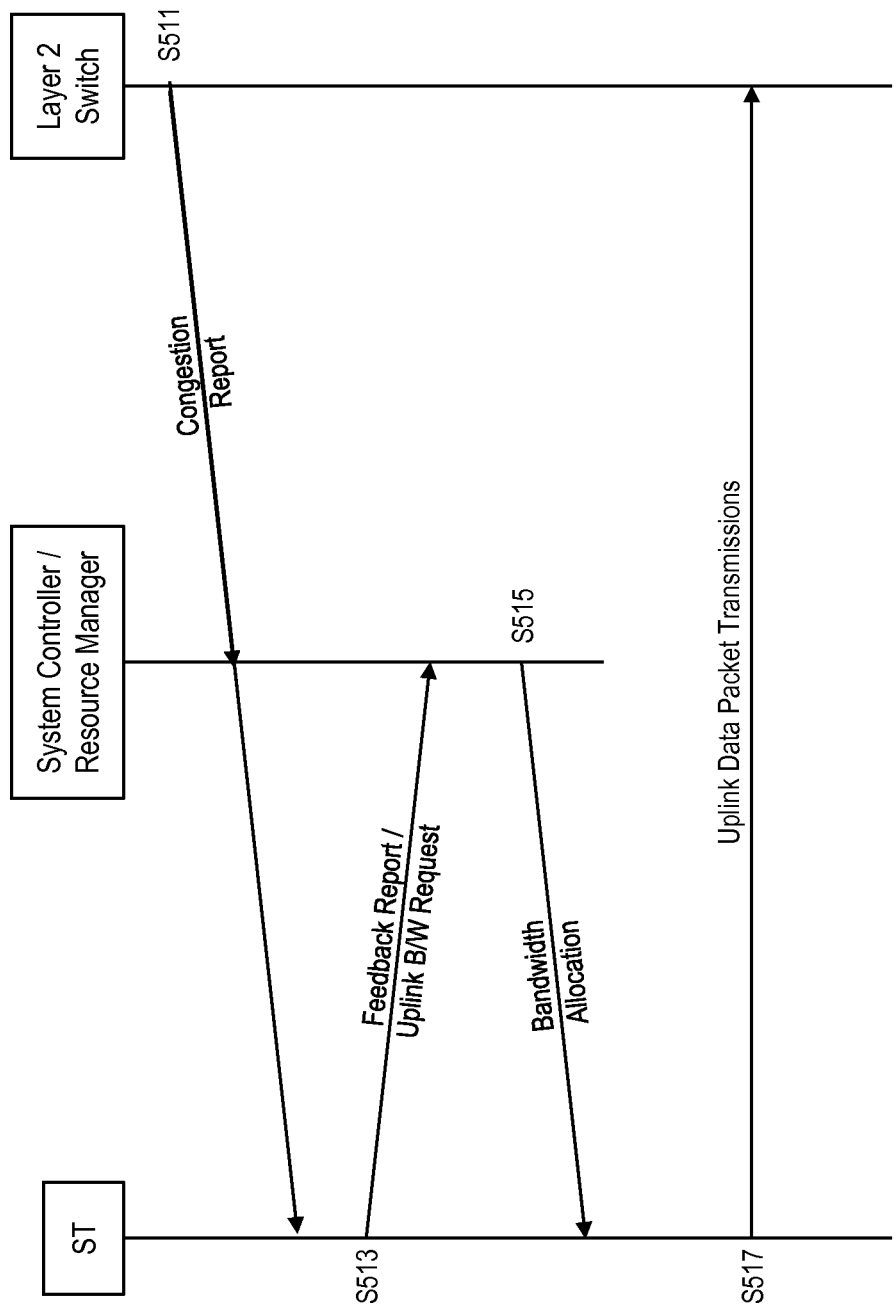
FIG. 6B illustrates a signal flow diagram depicting a process for efficient management of congestion for the downlink queues, where the congestion report is concurrently transmitted to the System Controller and broadcast to the STs, in accordance with example embodiments of the present invention.

In accordance with further embodiments, with either of the systems in FIG. 2 or FIG. 4, the Layer 2 switch 111 may concurrently send the congestion report to the SC 113 to all potential source STs (including the source ST 134s) (S511, FIG. 6B). As such, the SC 113 would not need to send a congestion notification to the STs. However, because the notification/report is coming directly from the Layer 2 switch, either the switch would need to be configured to provide the notification in a format that the STs would understand (e.g., in the same format as the congestion notification that would have come from the SC 113 per the prior embodiments), or the ST would need to be configured to be able to decode the congestion report as generated by the switch. Either way, the issue becomes a matter of programming the switch to generate the report in the appropriate format, or programming the ST to decode the format as provided by the switch. Upon receipt of the congestion notification, the ST 134s will again segregate its uplink data traffic by destination beam and by priority, and report back to the SC 113 as to the specific resource allocations required for each of the different traffic types the ST is attempting to transmit (S5513, FIG. 6B). Based on this report and associated uplink bandwidth request from the ST, the SC 113 in conjunction with the resource manager (RM) 115 allocates uplink bandwidth to the ST in order of priority (rationing the bandwidth allocations to meet the requirements of the ST while maintaining a traffic flow to not overload the downlink queue and alleviate the congestion of the respective beam), and sends the bandwidth allocations to the ST (S515, FIG. 6B). The ST would then begin transmitting the uplink packets in accordance with the allocated uplink bandwidth (S517, FIG. 6B).

The embodiment whereby the Layer 2 switch broadcasts congestion reports to all terminals acting as Layer 2 switches concurrently with its notification to the system controller would be well suited for the architecture employing the SC at the ground hub terminal. Terminals report aggregate volume demand every epoch based on the congestion notification separating the traffic requests for the congested downlinks from the traffic requests for the non-congested downlinks. The system controller grants uplink resources based on priority, traffic type, QoS objective(s), and destination. The terminals make new reports each epoch requesting increased or decreased resources based on downlink congestion. If the SC processor is located on-board the satellite, then the protocol shown in FIG. 6A is effectively identical with that shown in FIG. 6B. Alternatively, if the SC processor is located at a hub or gateway, then additional delay is introduced by the implementation shown in FIG. 6A as compared with that of FIG. 6B.

With reference to FIG. 5, this embodiment involves a communications system having two satellites 112a and 112b with over the air ISL 142 serving as a communications channel between the two satellites. The system and approaches of this embodiment operate similar to the embodiments described above with respect to FIG. 2. In this embodiment, however, the source ST 134s is transmitting to the two destination STs 134d(i) and 134d(ii) via both satellites. The source ST transmits the data to the Layer 2 switch 111a of satellite 112a, but in this instance the satellite 112b serves the respective downlink beams 123 and 125 of the destination STs. Accordingly, the Layer 2 switch 111a of the satellite 112a forwards the data packets to the Layer 2 switch 111b of the satellite 112b for transmission to the destination STs via the respective downlink beams. So here, because the satellite 112b serves the congested downlink beam 123, the Layer 2 switch 111b would detect the congestion in that downlink beam, and then accordingly sends the congestion report to the SC 113b (e.g., via the signal line or connection 402) (S521, FIG. 6C). The SC 113b forwards the congestion report to the SC 113a (also via the ISL 142) (S523, FIG. 6C). Upon receipt of the congestion report, each of the SCs 113a and 113b sends a congestion notification message or report to all potential source STs within the beams serviced by the respective satellite (including the source ST 134s within the beam 121 of the satellite 112a) (S524/525, FIG. 6C).

Figure 6C:
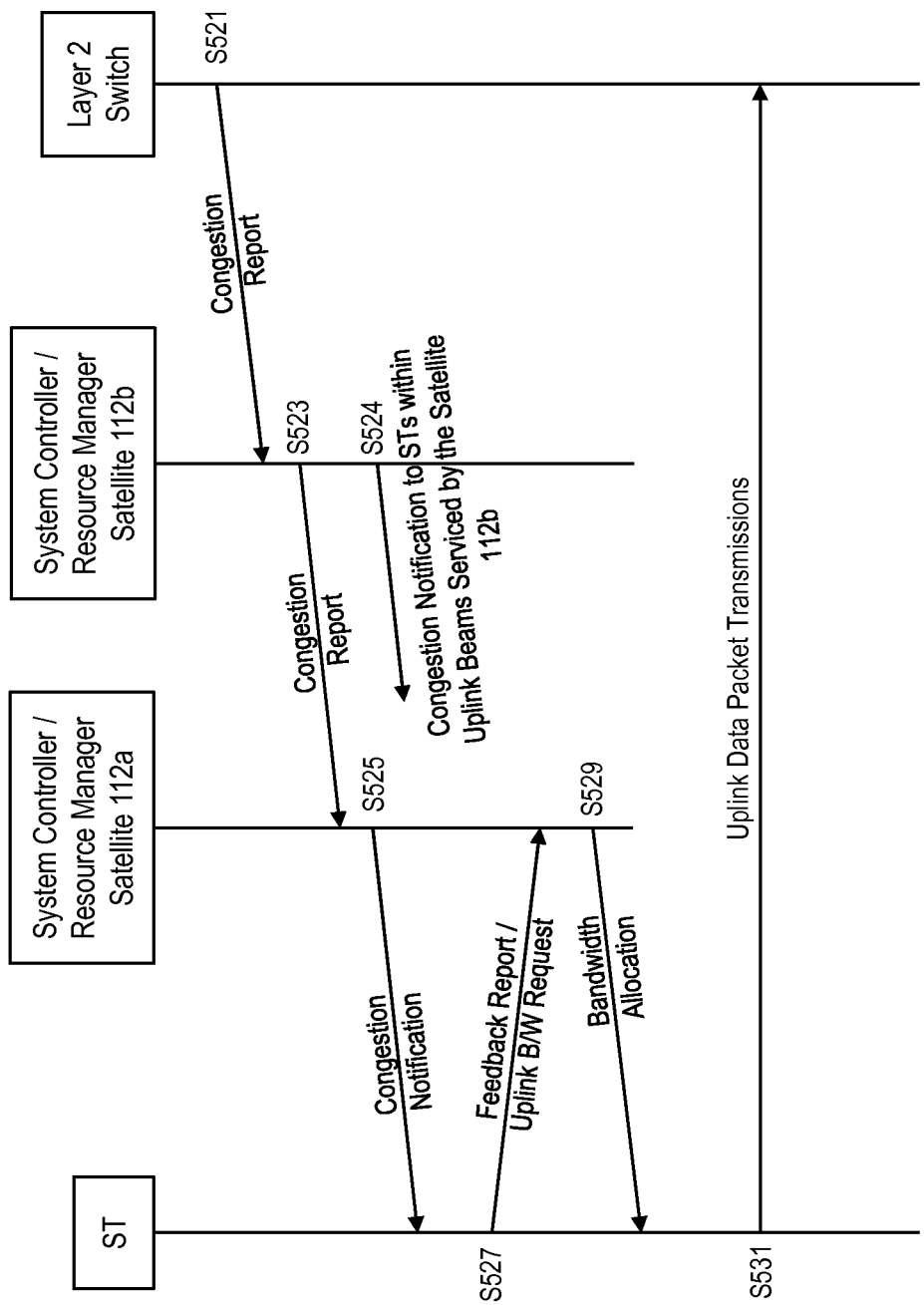
FIG. 6C illustrates a signal flow diagram depicting a process for efficient management of congestion for the downlink queues in a multi-satellite system, where the congestion report is transmitted to the System Controller, in accordance with example embodiments of the present invention.

Upon receipt of the congestion notification, the ST 134s segregates its uplink data traffic by destination beam and by priority, and reports back to the SC 113a as to the specific resource allocations required for each of the different traffic types the ST is attempting to transmit (S527, FIG. 6C). Based on this report and associated uplink bandwidth request from the ST, the SC 113a in conjunction with the RM 115a allocates uplink bandwidth to the ST in order of priority (rationing the bandwidth allocations to meet the requirements of the ST while maintaining a traffic flow to not overload the downlink queue and alleviate the congestion of the respective beam), and sends the bandwidth allocations to the ST (S529, FIG. 6c). The bandwidth allocation would be configured so as to only allocate so much uplink bandwidth at a time so in order to alleviate the congestion within the downlink beam 123. The bandwidth request and bandwidth allocation messaging are communicated via over the air transmission signals indicated by the communication line 406 between the ST 134s and the RM 115a. The resulting data transmissions by the ST 134s are communicated via over the air uplink transmissions 408 (S531, FIG. 6C), over the air ISL 142, and corresponding downlink transmissions 410 and 412. With respect to the data transmissions to the destination ST 134d(ii), because this ST is within the downlink beam 125 (which is not experiencing congestion), such transmissions occur based on a normal bandwidth request an allocation protocol.

Figure 7:
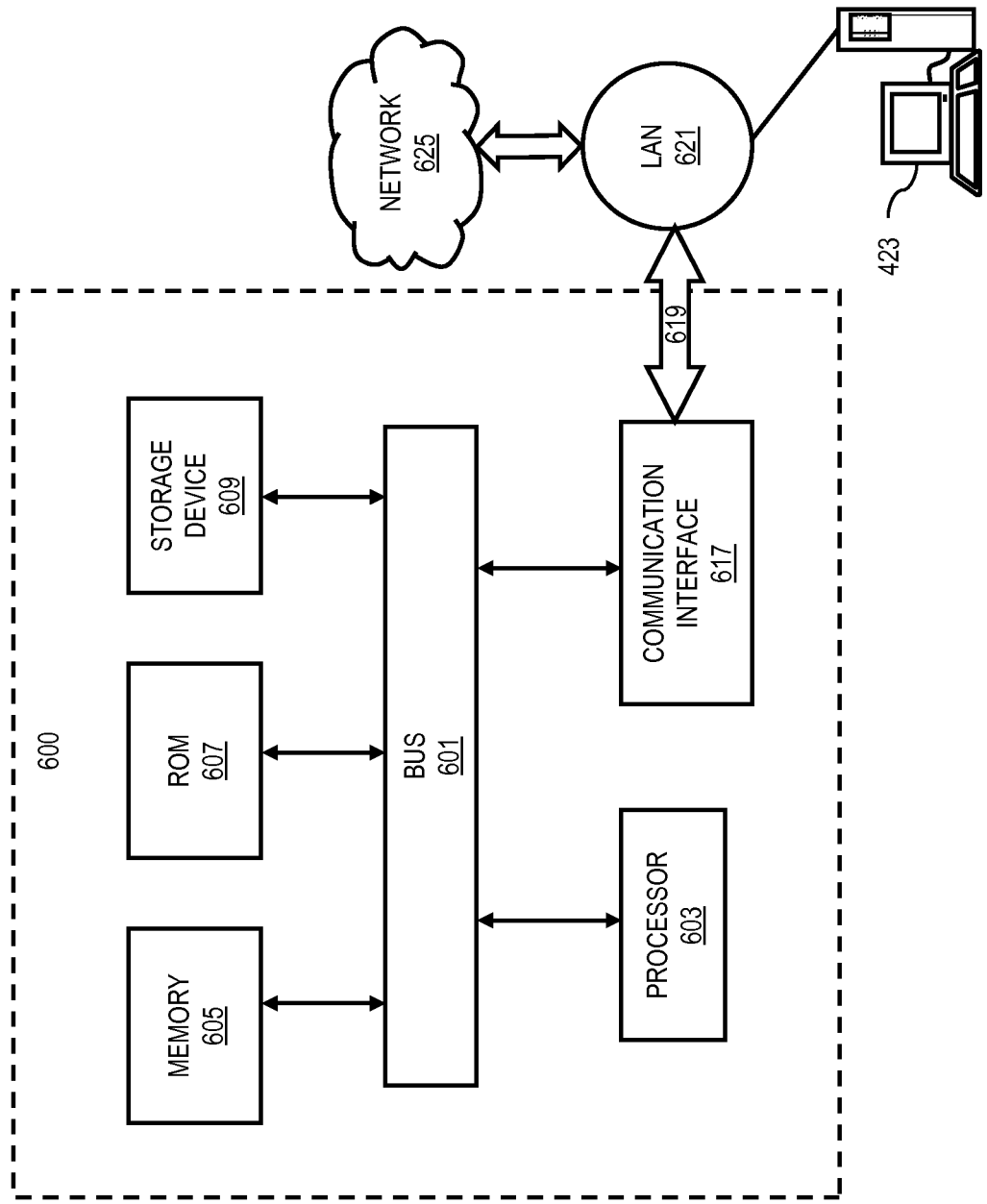
FIG. 7 illustrates a computer system upon which example embodiments of the present invention may be implemented.

FIG. 7 illustrates a computer or processing system upon which example embodiments according to the present invention may be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing data and instructions for program or process execution by the processor 603. Main memory 605 can also be used for storing temporary variables or other intermediate information during execution of instructions to be executed by the processor 603. The computer system 600 may further include a read only memory (ROM) 607 or other static storage device coupled to the bus 601 for storing static information and instructions for the processor 603. A storage device 609, such as a magnetic disk or optical disk, also may be coupled to the bus 601 for storing information and instructions.

According to one embodiment, architectures and methods for implementing embodiments of the present invention are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps of the methods and approaches described herein. One or more processors in a multi-processing arrangement may also be employed to execute the instructions. In alternative embodiments, hard-wired circuitry is used in place of or in combination with software instructions to implement embodiments of the present invention. Thus, embodiments of the present invention are not limited to any specific combination of hardware circuitry and software.

The computer system 600 may also include a communication interface 617 coupled to bus 601. The communication interface 617 provides a two-way data communication coupling to a network link 619 connected to a local network 621, for example. By way of example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617, for example, may include peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 provides a connection through local network 621 to a host computer 623, which has connectivity to a network 625 (e.g. a wide area network (WAN) or the Internet) or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are example forms of carrier waves bearing the information and instructions.

The computer system 600 may send messages and receives data, including program code, through the network (s), network link 619, and communication interface 617. In the Internet example, a server (not shown) might transmit requested code belonging to an application program for implementing an embodiment of the present invention through the network 625, local network 621 and communication interface 617. The processor 603 executes the transmitted code while being received and/or store the code in the storage device 609, or other non-volatile storage for later execution.

FIG. 8 illustrates a chip set 700 upon which example embodiments of the present invention may be implemented. Chip set 700 includes, for instance, processor and memory components described with respect to FIG. 8 incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 700 includes a communication mechanism such as a bus 701 for passing information among the components of the chip set 700. A processor 703 has connectivity to the bus 701 to execute instructions/programs and process information stored in, for example, a memory 705. The processor 703 may include one or more processing cores with each core configured to perform independently. A multi-core processor enables multiprocessing within a single physical package, such as two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, and/or one or more application-specific integrated circuits (ASIC) 709. A DSP 707 typically is configured to process real-time signals (e.g., sound or video) in real time independently of the processor 703. Similarly, an ASIC 709 can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 703 and accompanying components have connectivity to the memory 705 via the bus 701. The memory 705 may include both dynamic memory (e.g., RAM) and static memory (e.g., ROM) for storing executable instructions that, when executed by the processor 503 and/or the DSP 507 and/or the ASIC 509, perform the process of example embodiments as described herein. The memory 705 may also store the data associated with or generated by the execution of the process.

Further, the functionality of the example embodiments of the present invention may be provided by the chip set 700, in response to the processor 703 executing an arrangement of program instructions contained in memory 705. Execution of the program instructions contained in memory 705 causes the processor 703 to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for congestion management in a satellite communications system comprising a processing satellite, wherein the processing satellite comprises an on-board traffic switch, the method comprising:
    determining a utilized capacity level with respect to at least one port of a plurality of ports of the on-board traffic switch;
    providing a capacity report to a system controller, wherein the capacity report indicates the determined utilized capacity level for each port;
    determining that one or more of the utilized capacity levels indicates a congestion condition of a respective port;
    providing a congestion notification to one or more source satellite terminals (STs) that each has data packets destined for the at least one of the ports with respect to which the utilized capacity level indicates the congestion condition;
    receiving a feedback report from each of the source STs to which the congestion notification report was provided, wherein each feedback report indicates a quantity of the data packets destined for each port exhibiting the congestion condition and a breakdown of each quantity of data packets by priority level;
    determining an uplink allocation for each of the source STs that has data packets destined for the ports exhibiting the congestion condition, wherein each uplink allocation is based on the feedback report received from the respective ST, and wherein the uplink allocation to all of the source STs is configured to alleviate the congestion condition of each port that exhibits the condition; and
    sending the respective uplink allocation to each of the source STs that has data packets destined for the ports exhibiting the congestion condition.

2. The method for congestion management according to claim 1, wherein the uplink allocation for each of the source STs that has data packets destined for the outroute ports exhibiting the congestion condition allocates uplink bandwidth to the respective ST to meet the quantity of the data packets destined for each outroute port exhibiting the congestion condition in a priority order based on the breakdown of each quantity of data packets by priority level.

3. The method for congestion management according to claim 1, wherein the uplink allocation for each of the source STs that has data packets destined for the outroute ports exhibiting the congestion condition is configured to allocate an amount of bandwidth destined for each such port at a time in order to alleviate the congestion condition of the respective port and to address the priority levels of the packets destined for the respective port.

4. The method for congestion management according to claim 1, further comprising:
    receiving the congestion notification by at least one of the source STs that has data packets destined for at least one of the ports exhibiting the congestion condition;
    segregating, by at least one of the source STs that receives the congestion notification, a total quantity of data packets destined for each port exhibiting the congestion condition from a remaining quantity of data packets destined for other ports;
    determining the breakdown by priority level for each quantity of data packets destined for a respective port exhibiting the congestion condition; and
    determining, by the at least one of the source STs that receives the congestion notification, the respective feedback report based on the data packet segregation and the priority level breakdown determination, and transmitting the feedback report to the satellite.

5. The method for congestion management according to claim 1, further comprising:
    determining the uplink allocation for each of the source STs that has data packets destined for the ports exhibiting the congestion condition based on overall system requirements for bandwidth destined for each of the ports exhibiting the congestion condition.

6. The method for congestion management according to claim 1, wherein the uplink allocation for each of the source STs that has data packets destined for the ports exhibiting the congestion condition is based on respective periods of time or bandwidth allocation epochs.

7. The method for congestion management according to claim 6, wherein the period of time for each bandwidth allocation epoch is based on one or more of a round trip delay between the satellite and the respective source STs, a respective queuing delay and a respective processing time.

8. An on-board traffic switch of a data communications satellite, comprising:
    a packet switch;
    a system controller; and
    a bandwidth management controller; and
    wherein the packet switch is configured to transmit data packets to one or more downlink cells of the communications satellite via a respective port of a plurality of ports for each downlink cell, to determine a utilized capacity level with respect to each port, and to provide a capacity report to the system controller indicating the determined utilized capacity level for each port,
    wherein the system controller is configured to determine that one or more of the utilized capacity levels indicates a congestion condition of a respective port, to provide a congestion notification for one or more source satellite terminals (STs) that each has data packets destined for at least one of the ports with respect to which the utilized capacity level indicates the congestion condition, to receive a feedback report from each of the source STs to which the congestion notification report was provided, wherein each feedback report indicates a quantity of the data packets destined for each port exhibiting the congestion condition and a breakdown of each quantity of data packets by priority level, and
    wherein the bandwidth management controller is configured to determine an uplink allocation for each of the source STs that has data packets destined for the ports exhibiting the congestion condition, wherein each uplink allocation is based on the feedback report received from the respective ST, and wherein the uplink allocation to all of the source STs is configured to alleviate the congestion condition of each port that exhibits the condition, and to provide the respective uplink allocation for each of the source STs that has data packets destined for the ports exhibiting the congestion condition.

9. The on-board traffic switch according to claim 8, wherein the uplink allocation for each of the source STs that has data packets destined for the ports exhibiting the congestion condition allocates uplink bandwidth to the respective ST to meet the respective quantity of the data packets destined for each port exhibiting the congestion condition in a priority order based on the breakdown of each quantity of data packets by priority level.

10. The on-board traffic switch according to claim 8, wherein the uplink allocation for each of the source STs that has data packets destined for the ports exhibiting the congestion condition is configured to allocate an amount of bandwidth destined for each such port at a time in order to alleviate the congestion condition of the respective port and to address the priority levels of the respective packets destined for the respective port.

11. The on-board traffic switch according to claim 8, wherein the uplink allocation for each of the source STs that has data packets destined for ports exhibiting the congestion condition is based on respective periods of time or bandwidth allocation epochs.

12. The on-board traffic switch according to claim 11, wherein the period of time for each bandwidth allocation epoch is based on one or more of a round trip delay between the data communications satellite and the respective source STs, a respective queuing delay and a respective processing time.

13. A satellite communications system, comprising:
a data communications satellite, comprising a packet switch, a system controller and a bandwidth management controller; and
one or more source satellite terminals (STs); and
wherein the packet switch is configured to transmit data packets to one or more downlink cells of the communications satellite via a respective port of a plurality of ports for each downlink cell, to determine a utilized capacity level with respect to each port, and to provide a capacity report to the system controller indicating the determined utilized capacity level for each port;
wherein the system controller is configured to determine that one or more of the utilized capacity levels indicates a congestion condition of a respective port, to provide a congestion notification for the source STs that have data packets destined for at least one of the ports with respect to which the utilized capacity level indicates the congestion condition, to receive a feedback report from each of the source STs to which the congestion notification report was provided, wherein each feedback report indicates a quantity of the data packets destined for each port exhibiting the congestion condition and a breakdown of each quantity of data packets by priority level,
wherein the bandwidth management controller is configured to determine an uplink allocation for each of the source STs that has data packets destined for the ports exhibiting the congestion condition, wherein each uplink allocation is based on the feedback report received from the respective ST, and wherein the uplink allocation to all of the source STs is configured to alleviate the congestion condition of each port that exhibits the condition, and to provide the respective uplink allocation for each of the source STs that has data packets destined for the ports exhibiting the congestion condition, and
wherein at least one of the source STs is configured to receive the congestion notification, to segregate a total quantity of data packets destined for each port exhibiting the congestion condition from a remaining quantity of data packets destined for other ports, to determine the breakdown by priority level for each quantity of data packets destined for a respective port exhibiting the congestion condition, to determine the respective feedback report based on the data packet segregation and the priority level breakdown determination, and to transmit the feedback report to the data communications satellite.

14. The satellite communications system according to claim 13, wherein the bandwidth management controller is configured to determine the uplink allocation for each of the source STs that has data packets destined for the ports exhibiting the congestion condition based on overall system requirements for bandwidth destined for each of the ports exhibiting the congestion condition.

15. The satellite communications system according to claim 13, wherein the uplink allocation for each of the source STs that has data packets destined for the ports exhibiting the congestion condition allocates uplink bandwidth to the respective ST to meet the respective quantity of the data packets destined for each port exhibiting the congestion condition in a priority order based on the breakdown of each quantity of data packets by priority level.

16. The satellite communications system according to claim 13, wherein the uplink allocation for each of the source STs that has data packets destined for the ports exhibiting the congestion condition is configured to allocate an amount of bandwidth destined for each such port at a time in order to alleviate the congestion condition of the respective port and to address the priority levels of the respective packets destined for the respective port.

17. The satellite communications system according to claim 13, wherein the uplink allocation for each of the source STs that has data packets destined for the ports exhibiting the congestion condition is based on respective periods of time or bandwidth allocation epochs.

18. The satellite communications system according to claim 17, wherein the period of time for each bandwidth allocation epoch is based on one or more of a round trip delay between the data communications satellite and the respective source STs, a respective queuing delay and a respective processing time.

* * * * *